US010534380B2

(12) United States Patent
Zhou et al.

(10) Patent No.: US 10,534,380 B2
(45) Date of Patent: Jan. 14, 2020

(54) PRESSURE REGULATOR

(71) Applicant: FISHER JEON GAS EQUIPMENT (CHENGDU) CO., LTD., Chengdu (CN)

(72) Inventors: Biao Zhou, Chengdu (CN); Zhongyang Xiao, Chengdu (CN)

(73) Assignee: FISHER JEON GAS EQUIPMENT (CHENGDU) CO., LTD., Chengdu (CN)

( * ) Notice: Subject to any disclaimer, the term of this patent is extended or adjusted under 35 U.S.C. 154(b) by 64 days.

(21) Appl. No.: 15/508,471

(22) PCT Filed: Sep. 3, 2015

(86) PCT No.: PCT/US2015/048327
§ 371 (c)(1),
(2) Date: Mar. 2, 2017

(87) PCT Pub. No.: WO2016/036942
PCT Pub. Date: Mar. 10, 2016

(65) Prior Publication Data
US 2017/0300070 A1 Oct. 19, 2017

(30) Foreign Application Priority Data
Sep. 3, 2014 (CN) .................... 2014 2 0521883 U
Jul. 6, 2015 (IN) ......................... 2578/MUM/2015

(51) Int. Cl.
G05D 16/06 (2006.01)
(52) U.S. Cl.
CPC ...... G05D 16/0686 (2013.01); Y10T 137/783 (2015.04); Y10T 137/7831 (2015.04)

(58) Field of Classification Search
CPC .......... Y10T 137/783; Y10T 137/7831; G05D 16/0686
(Continued)

(56) References Cited

U.S. PATENT DOCUMENTS 1,839,980 A * 1/1932 Luchs ...................... A62B 9/02
128/204.28
2,015,930 A * 10/1935 Groble ............... G05D 16/0683
137/315.04
(Continued)

FOREIGN PATENT DOCUMENTS

CH 574068 A5 3/1976
DE 1260257 B 2/1968
(Continued)

OTHER PUBLICATIONS

International Search Report and Written Opinion received for PCT/US2015/048327 dated Jan. 14, 2016.
Office Action received for EP 15 767 375.7 dated Oct. 1, 2018.

Primary Examiner — William M McCalister
(74) Attorney, Agent, or Firm — Marshall, Gerstein & Borun LLP

(57) ABSTRACT

A regulator is disclosed that controls fluid flow through a control valve via a linkage including a lever that is acted upon by a spring cylinder acting in a direction perpendicular to the direction of fluid flow through pipes connected to the control valve. The closure performance of the control valve of the regulator is optimized by the direction the spring cylinder acts and the mechanical advantage the lever provides. The regulator further includes a diaphragm and diaphragm cover, and the regulator is configured to allow the diaphragm cover to be stamped rather than cast.

20 Claims, 4 Drawing Sheets

(58) Field of Classification Search
USPC .................................... 137/505.46, 505.47
See application file for complete search history.

(56) References Cited

U.S. PATENT DOCUMENTS

| | | | | | |
|---|---|---|---|---|---|
| 2,987,074 | A | * | 6/1961 | Niesemann | G05D 16/0694 137/505.46 |
| 2,989,970 | A | * | 6/1961 | Early | A61M 16/00 137/505.46 |
| 3,003,520 | A | * | 10/1961 | Corey | G05D 16/0683 137/484.8 |
| 3,105,513 | A | * | 10/1963 | Ray | G05D 16/0686 137/484.8 |
| 3,179,118 | A | * | 4/1965 | Mitchell | B63C 11/2227 137/505.12 |
| 3,207,175 | A | * | 9/1965 | Pauly | G05D 16/0694 137/116.5 |
| 3,236,250 | A | * | 2/1966 | Colombo | A62B 9/022 137/81.2 |
| 4,214,580 | A | * | 7/1980 | Pedersen | A62B 9/022 128/204.26 |
| 4,446,859 | A | * | 5/1984 | Pedersen | A62B 9/022 128/204.26 |
| 4,503,883 | A | * | 3/1985 | Meacham, Jr. | G05D 16/0686 137/458 |
| 5,797,425 | A | * | 8/1998 | Carter | G05D 16/0677 137/505.12 |
| 5,881,765 | A | * | 3/1999 | Turney | G05D 16/0658 137/484.4 |
| 2006/0065307 | A1 | * | 3/2006 | Schmidt | G05D 16/02 137/505.46 |
| 2007/0044845 | A1 | * | 3/2007 | Childers | G05D 16/0686 137/505.47 |

FOREIGN PATENT DOCUMENTS

DE           1500123 A1    7/1969
WO   WO-2012126185 A1    9/2012

\* cited by examiner

PRESSURE REGULATOR

FIELD OF THE DISCLOSURE

This disclosure relates generally to a regulator for changing the flow rate through a control valve in order to maintain a predetermined pressure at an outlet. In particular, this disclosure relates to a regulator that controls fluid flow through a control valve via a linkage including a lever that is acted upon by a spring cylinder acting in a direction perpendicular to the direction of fluid flow through the control valve.

BACKGROUND

A regulator is known in the art as a device that can change the flow rate through a control valve in order to maintain a predetermined pressure at an outlet. Some known regulators control fluid flow through a control valve via a lever that is acted upon by a diaphragm contained in a housing having a spring cylinder in an upper chamber that acts upon the diaphragm in a direction parallel to the direction of fluid flow through the control valve. Such regulators require a diaphragm cover that is made through a casting process, which is expensive. Other known regulators control fluid flow through a control valve without a lever via a diaphragm having a spring cylinder acting in an lower chamber that acts in a direction perpendicular to the direction of fluid flow through the control valve. Such regulators can have a housing that is stamped rather than cast, which is more cost effective. However, the closure performance of the control valve achieved by such regulators is lower than that achieved by regulators employing a lever.

SUMMARY

The present disclosure is directed to a regulator that controls fluid flow through a control valve via a linkage including a lever that is acted upon by a diaphragm having a spring cylinder in an upper chamber that acts in a direction perpendicular to the direction of fluid flow through the control valve. The diaphragm cover for embodiments within the scope of the present invention can be stamped, resulting in a lower cost than would be the case if it had to be cast, while the linkage including the lever allows for high closure performance of the control valve.

The regulator of the present disclosure includes a diaphragm contained in a housing. The diaphragm divides the housing into two parts, an upper part that includes a diaphragm cover and a lower part. A spring is disposed in the upper part of the housing between the diaphragm and the diaphragm cover. In the lower part of the housing, the diaphragm is connected to a lever, which is part of a linkage that controls a valve stem. Movement of the spring causes the diaphragm to move, which moves the linkage and ultimately results in the valve stem moving to control the flow of fluid through a control valve.

The linkage includes the lever and a link. The lever has a main body portion, a first end portion connected to a first end of the main body, and a second end portion connected to a second end of the main body and to the lower part of the housing. The link has a first section connected to the lever, and a second section connected to a valve stem. The link is connected to the lower part of the housing at a fixed hinge point at or near the location where the first section meets the second section.

In some embodiments within the scope of the present disclosure, the second end portion of the lever of the linkage has a sliding connection with the lower part of the housing and the lever is connected to the link at a fixed hinge point. In other embodiments within the scope of the present disclosure, the second end portion of the lever of the linkage is connected at a fixed hinge point to the lower part of the housing and the lever has a sliding connection with the link. In other embodiments within the scope of the present disclosure, the second end portion of the lever of the linkage has a sliding connection with the lower part of the housing and the lever has a sliding connection with the link.

DETAILED DESCRIPTION

Figure 1:
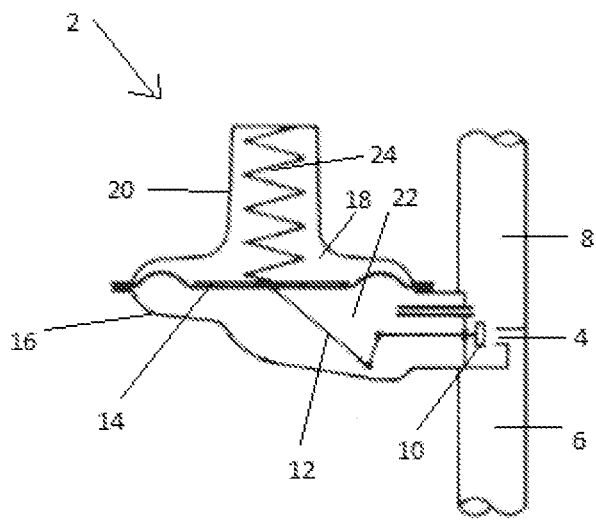
FIG. 1 is a front view of a regulator known in the art that has a cast diaphragm cover and controls fluid flow through a control valve via a lever that is acted upon by a spring cylinder in a direction parallel to the direction of fluid flow through the control valve.

FIG. 1 depicts a regulator 2 known in the art that controls fluid flow through a control valve 4 located between a first pipe 6 and a second pipe 8. The regulator 2 has a valve stem 10 that moves to adjust fluid flow through the control valve 4. The valve stem 10 is connected to a lever 12 that is acted upon by a diaphragm 14. The diaphragm is contained in a housing 16 having a upper chamber 18 formed in part by a diaphragm cover 20 and a lower chamber 22. A spring 24 is located in the upper chamber 18 and acts on the diaphragm 14 in a direction parallel to the flow of fluid through first pipe 6 and second pipe 8. The lever 12 provides a desirable mechanical advantage as it amplifies the force exerted on it by the diaphragm 14. Unfortunately, the configuration of the regulator 2 requires that the diaphragm cover 20 be cast, which is expensive. Further, the direction of the force exerted by the spring 24 must be rotated 90° to move the valve stem 10 to restrict fluid flow through the control valve 4.

Figure 2:
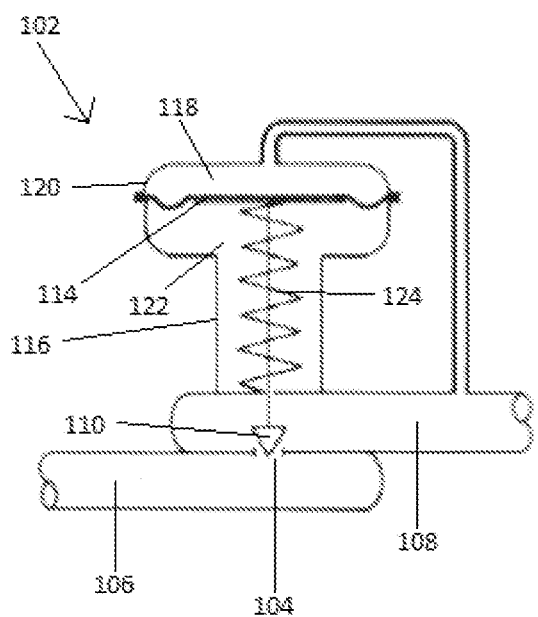
FIG. 2 is a front view of a regulator known in the art that has a stamped diaphragm cover and controls fluid flow through a control valve without a lever as a result of action by a spring cylinder in a direction perpendicular to the direction of fluid flow through the control valve.

FIG. 2 depicts a regulator 102 known in the art that controls fluid flow through a control valve 104 located between a first pipe 106 and a second pipe 108. The regulator 102 has a valve stem 110 that moves to adjust fluid flow through the control valve 104. The valve stem 110 is connected to a spring 124 that is acted upon by a diaphragm 114. The spring 124 acts in a direction perpendicular to the flow of fluid through the first pipe 106 and second pipe 108. The diaphragm 114 is contained in a housing 116 having an upper chamber 118 formed in part by a diaphragm cover 120 and a lower chamber 122 containing the spring 124. The upper chamber 118 of the housing 116 is connected to the second pipe 108 downstream of the control valve 104. The configuration of the regulator 102 allows for the diaphragm cover 120 to be stamped, which is less expensive than casting, and the direction of force exerted by the spring 124 does not need to be rotated in order to move the valve stem 110 to restrict fluid flow through the control valve 104. However, regulator 102 does not have a lever and accordingly no mechanical advantage exists for purposes of regulating fluid through the control valve 104.

Figure 3:
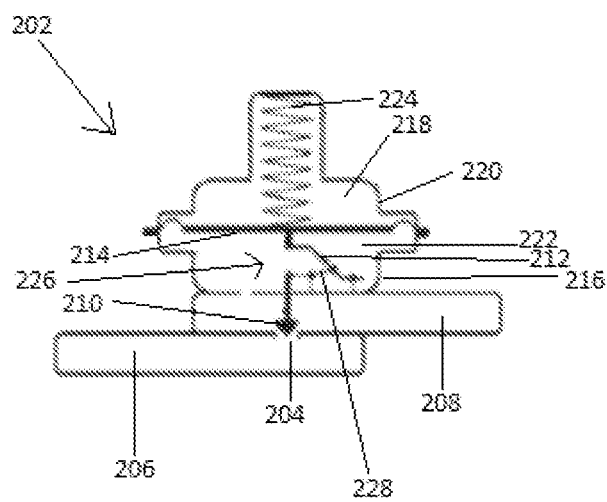
FIG. 3 is a front view of the regulator of the present disclosure that has a stamped diaphragm cover and controls fluid flow through a control valve via a lever and linkage that is acted upon by a spring cylinder in a direction perpendicular to the direction of fluid flow through the control valve.

FIG. 3 depicts a regulator 202 of the present disclosure that controls fluid flow through a control valve 204 located between a first pipe 206 and a second pipe 208. The regulator 202 has a valve stem 210 that moves to adjust fluid flow through the control valve 204. The valve stem 210 is connected to a linkage 226 that includes a lever 212 and a link 228. In particular, the valve stem 210 is connected to the link 228, which is connected to the lever 212. The lever 212 is acted upon by a diaphragm 214. The diaphragm 214 is contained in a housing 216 having a upper chamber 218 formed in part by a diaphragm cover 220 and a lower chamber 222. A spring 224 is located in the upper chamber 218 and acts on the diaphragm 214 in a direction perpendicular to the flow of fluid through first pipe 6 and second pipe 8. The lever 212 provides a desirable mechanical advantage as it amplifies the force exerted on it by the diaphragm 14. Furthermore, the configuration of the regulator 2 allows for the diaphragm cover 220 to be stamped rather than cast, resulting in less expense, and the direction of force exerted by the spring 224 does not need to be rotated in order to move the valve stem 210 to restrict fluid flow through the control valve 204.

Figure 4:
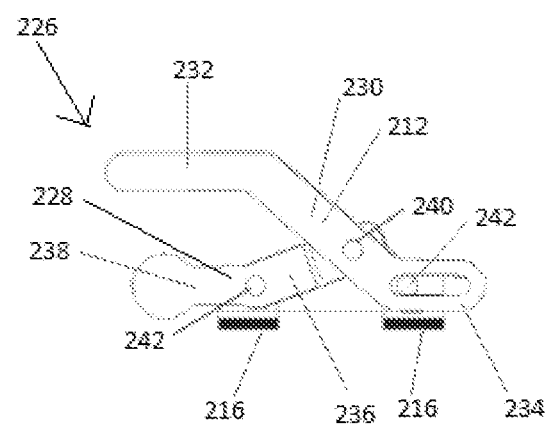
FIG. 4 is a front view of a linkage of the present disclosure wherein a second end portion of a lever of the linkage has a sliding connection with a lower part of a housing of a regulator and the lever is connected to the link at a fixed hinge point.

FIG. 4 depicts one embodiment of a linkage 226 of a regulator 202 within the scope of the present disclosure. The linkage 226 includes lever 212 and link 228. The lever 212 has a main body portion 230, a first end portion 232 connected to a first end of the main body 230, and a second end portion 234 connected to the second end of the main body and to the lower part of the housing 216 at lever-housing connection 242. The link 228 has a first section 236 connected to the lever 212 at lever-link connection 240, and a second section 238 connected to the lower part of the housing 216 at a lever-housing fixed hinge point 242 at or near where the first section 236 meets the second section 238.

Figure 5:
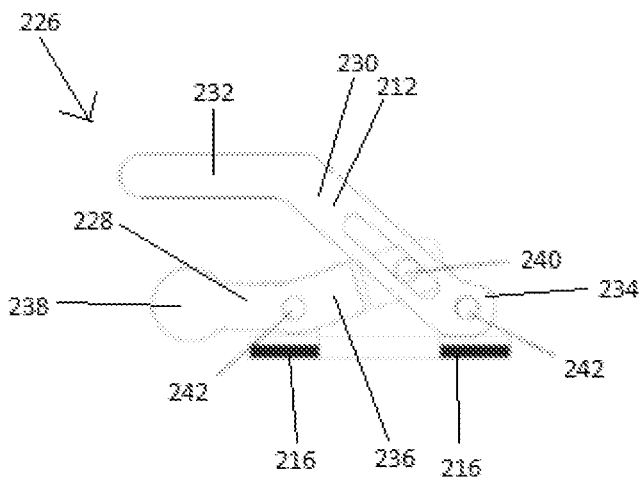
FIG. 5 is a front view of a linkage of the present disclosure wherein a second end portion of a lever of the linkage has a fixed connection with a lower part of a housing of a regulator and the lever has a sliding connection with a link.
Figure 6:
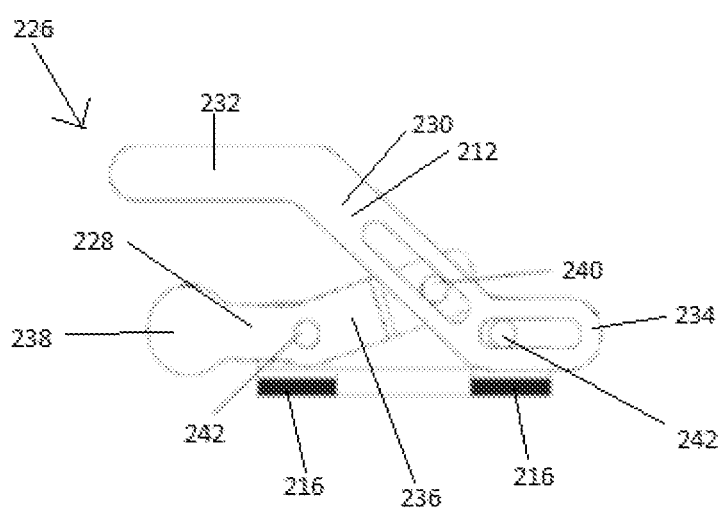
FIG. 6 is a front view of a linkage of the present disclosure wherein a second end portion of a lever of the linkage has a sliding connection with the lower part of a housing of a regulator and the lever has a sliding connection with a link.
Figure 7:
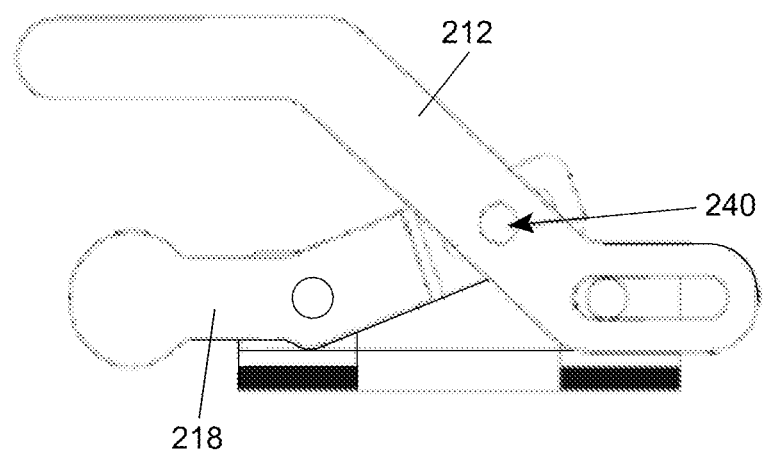
FIG. 7 is a front view of a linkage of the present disclosure similar to FIG. 6 but with an alternative arrangement for the sliding connection.

In the embodiment depicted in FIG. 4, the lever-link connection 240 is a fixed hinge point and the lever-housing connection 242 is a sliding connection, for example, a movable pivot that can slide within a groove. In the embodiment depicted in FIG. 5, the lever-link connection 240 is a sliding connection, for example, a movable pivot that can slide within a groove, while the lever-housing connection 242 is a fixed hinge point. In the embodiment depicted in FIG. 6, the lever-link connection 240 is a sliding connection, for example, a movable pivot that can slide within a groove, and the lever-housing connection 242 is also a sliding connection, for example, a movable pivot that can slide within a groove. The embodiment of FIG. 7 is similar to that of FIG. 6, although the lever-link connection 240 is arranged so that the pivot is carried by the link 228 and the groove is carried by the lever 212.

While the present disclosure has been described with respect to certain embodiments, it will be understood that variations may be made thereto that are still within the scope of the appended claims.

What is claimed is:

1. A fluid control device, comprising:
an actuator having a diaphragm;
a body having a seat that is positioned along a fluid flow path;
a control member that is moveable between a first position in which the control member is spaced away from the seat and a second position in which the control member contacts the seat; and
a linkage that operably couples the diaphragm with the control member, wherein the linkage is configured to transfer a movement of the diaphragm along a first axis into a movement of the control member along a second axis that is aligned or parallel with the first axis, wherein the linkage comprises a lever and a link, wherein the lever is pivotable about a connector that is directly fixed to a housing of the actuator, and wherein the connector is engaged with a groove in the lever such that a pivot point of the lever about the connector is moveable along the direction of the groove by the cooperation of the groove and the connector.

2. The fluid control device of claim 1, wherein the linkage comprises:
a lever that is operably coupled to the diaphragm; and
a link that is operably coupled to the control member and pivotably coupled to the lever.

3. The fluid control device of claim 2, wherein the link is coupled to a stem that is coupled to the control member.

4. The fluid control device of claim 2, wherein the link is pivotably coupled to a housing of the actuator.

5. The fluid control device of claim 2, wherein a first portion of the lever is operably coupled to the actuator.

6. The fluid control device of claim 5, wherein the link is pivotably coupled to an intermediate portion of the lever.

7. The fluid control device of claim 6, wherein a second portion of the lever is pivotably coupled to a housing of the actuator.

8. The fluid control device of claim 2, wherein the lever comprises:
a first portion having a first end and a second end;
a second portion having a third end and a fourth end, wherein the second portion is parallel with the first portion; and
an intermediate portion that is non-parallel with the first and second portions, wherein the intermediate portion extends from the second end to the third end.

9. The fluid control device of claim 8, wherein the lever is pivotable about a pin that extends between a housing of the actuator and the second portion of the lever.

10. The fluid control device of claim 9, wherein the pin is slidable within a groove in the second portion of the lever.

11. A fluid control device, comprising:
an actuator housing having a diaphragm that divides the actuator housing into an upper portion and a lower portion;

a body that defines at least a portion of a flow path between an inlet and an outlet;

a control member that is moveable between a first position that permits fluid flow along the flow path and a second position that restricts fluid flow along the flow path; and a linkage that operably couples the diaphragm and the control member, wherein the linkage comprises:

a lever that is operably coupled to the diaphragm, wherein the lever has a first end that is moveable along a first axis based on movement of the diaphragm, wherein the lever is pivotable about a connector that is directly fixed to the actuator housing, and wherein the connector is engaged with a groove in the lever such that a pivot point of the lever about the connector is moveable along the direction of the groove by the cooperation of the groove and the connector; and a link that is operably coupled to the control member and pivotably coupled to the lever, wherein the link is configured to move the control member along a second axis that is aligned or parallel with the first axis.

12. The fluid control device of claim 11, wherein movement of the first end of the lever in a first direction is configured to cause the link to move the control member in a second direction that is opposite the first direction.

13. The fluid control device of claim 11, wherein a spring is positioned in the upper portion of the actuator housing and biases the diaphragm toward the lower portion of the actuator housing.

14. The fluid control device of claim 13, wherein the lower portion of the actuator housing is configured to receive a control fluid, wherein a fluid pressure of the control fluid operates on the diaphragm to urge the diaphragm toward the upper portion of the actuator housing.

15. The fluid control device of claim 11, wherein the link is coupled to a stem that is coupled to the control member.

16. The fluid control device of claim 11, wherein the link is pivotably coupled to the actuator housing.

17. The fluid control device of claim 11, wherein the lever comprises:

a first portion having the first end and a second end;

a second portion having a third end and a fourth end, wherein the second portion is parallel with the first portion; and an intermediate portion that is non-parallel with the first and second portions, wherein the intermediate portion extends from the second end to the third end.

18. The fluid control device of claim 17, wherein the link is pivotably coupled to the intermediate portion of the lever.

19. The fluid control device of claim 17, wherein the lever is pivotable about a pin that extends between the actuator housing and the second portion of the lever.

20. The fluid control device of claim 19, wherein the pin is slidable within a groove in the second portion of the lever.

* * * * *

UNITED STATES PATENT AND TRADEMARK OFFICE
CERTIFICATE OF CORRECTION

PATENT NO. : 10,534,380 B2
APPLICATION NO. : 15/508471
DATED : January 14, 2020
INVENTOR(S) : Biao Zhou et al.

Page 1 of 1

It is certified that error appears in the above-identified patent and that said Letters Patent is hereby corrected as shown below:

In the Specification

At Column 1, Line 28, "an lower" should be -- a lower --.

At Column 2, Line 59, "a upper" should be -- an upper --.

At Column 3, Line 34, "a upper" should be -- an upper --.

In the Claims

At Column 4, Lines 34-36, "the linkage comprises: a lever that" should be -- the lever --.

At Column 4, Line 37, "a link that" should be -- wherein the link --.

Signed and Sealed this
Fifteenth Day of December, 2020

Andrei Iancu
*Director of the United States Patent and Trademark Office*